(12) United States Patent
Yamada et al.

(10) Patent No.: US 8,058,770 B2
(45) Date of Patent: Nov. 15, 2011

(54) IMAGE STABILIZATION CONTROL CIRCUIT, IMAGING DEVICE, AND PIEZOELECTRIC ACTUATOR DRIVE CIRCUIT

(75) Inventors: Yoshihisa Yamada, Inazawa (JP); Tomonori Kamiya, Ichinomiya (JP)

(73) Assignees: Sanyo Electric Co., Ltd., Moriguchi-shi (JP); Sanyo Semiconductor Co., Ltd., Ora-gun (JP)

( * ) Notice: Subject to any disclaimer, the term of this patent is extended or adjusted under 35 U.S.C. 154(b) by 455 days.

(21) Appl. No.: 12/314,663

(22) Filed: Dec. 15, 2008

(65) Prior Publication Data

US 2009/0152985 A1    Jun. 18, 2009

(30) Foreign Application Priority Data

Dec. 18, 2007    (JP) ................................. 2007-326113

(51) Int. Cl.
*H01L 41/08*    (2006.01)
(52) U.S. Cl. ........................................................ 310/317

(58) Field of Classification Search .................. 310/317, 310/328, 316.01, 311, 316.02, 319; *H01I 41/08*
See application file for complete search history.

(56) References Cited

U.S. PATENT DOCUMENTS

| 5,917,267 A * | 6/1999 | Miyazawa et al. | ............ 310/317 |
| 2006/0082253 A1* | 4/2006 | Hara | .............................. 310/317 |

* cited by examiner

*Primary Examiner* — Thomas Dougherty
*Assistant Examiner* — Karen B Addison
(74) *Attorney, Agent, or Firm* — Oliff & Berridge, PLC

(57) ABSTRACT

In a drive circuit for a piezoelectric actuator, it is possible to move a movement object to a target position rapidly and with good precision. Parameters for two types of drive pulses (PL1, PL2) having different duty ratios are stored in a register (28). A pulse generation circuit (26) is configured so as to be able to switch, based on a parameter stored in the register (28), between (PL1) having a large displacement step width of a lens (8), and (PL2) having a small displacement step width. The lens (8) can be rapidly moved through coarse movement by (PL1), and the lens (8) can be made to approach the target position with good precision through fine movement by (PL2).

5 Claims, 6 Drawing Sheets

IMAGE STABILIZATION CONTROL CIRCUIT, IMAGING DEVICE, AND PIEZOELECTRIC ACTUATOR DRIVE CIRCUIT

CROSS-REFERENCE TO RELATED APPLICATION

The priority application number JP 2007-326113 upon which this patent application is based is hereby incorporated by reference.

BACKGROUND OF THE INVENTION

1. Field of the Invention

The present invention relates to a drive circuit for generating a drive signal for an impact drive actuator in which a piezoelectric element is used; to an image stabilization control circuit for compensating for shaking of an imaging device using the drive circuit; and to an imaging device that uses the image stabilization control circuit.

2. Description of the Related Art

Piezoelectric actuators that utilize the electrostriction effects of a piezoelectric element have conventionally been used for camera shake compensation, autofocus, and the like, for example.

An impact drive piezoelectric actuator has a drive shaft for retaining a movement object with the aid of friction, and the drive shaft is extended and retracted by a piezoelectric element. A drive circuit generates a voltage signal whereby the drive shaft has a different speed during extension and during retraction, i.e., a voltage signal whereby the drive shaft slowly extends and rapidly retracts, or does the opposite, and the drive circuit applies the voltage signal to the piezoelectric element. During rapid movement of the drive shaft, the movement object slides with respect to the drive shaft due to inertia and remains substantially in position. If the drive shaft is moved slowly, the position of the movement object is displaced along with the drive shaft by static friction. The movement object can by displaced in a specific direction with respect to the drive shaft by this extension and retraction.

This displacement can be achieved in principle by applying a voltage signal that has a jagged waveform having different rising times and falling times to the piezoelectric element. However, the drive signal outputted from the drive circuit need not necessarily have a jagged waveform, and it is known that the displacement described above can be obtained by adjusting the frequency or duty ratio even when the signal has a square waveform. The movement speed of the movement object is dependent on the frequency and duty ratio of the drive signal, and the moving direction can be varied by inverting the duty ratio, for example.

SUMMARY OF THE INVENTION

It is possible to move a moving object by a piezoelectric actuator to a target position rapidly and with good precision.

The piezoelectric actuator drive circuit used in the image stabilization control circuit of the present invention, and the piezoelectric actuator drive circuit of the present invention generate a square-waveform drive signal for driving a piezoelectric actuator for displacing an object one step at a time, and have a duty storage unit for storing information for defining first and second duty states for producing displacements having mutually different step widths for a duty of the drive signal; a drive signal generation unit for generating the drive signal of the first or second duty state on the basis of information stored in the duty storage unit; and a control unit capable of controlling whether the generated drive signal is set to any of the first and second duty states and switching between displacing the object through fine movement having a small step width, and displacing the object through coarse movement having a large step width.

DESCRIPTION OF THE PREFERRED EMBODIMENTS

Embodiments of the present invention (hereinafter referred to as embodiments) will be described hereinafter based on the drawings. In the present embodiment, the present invention is applied to a camera, and a piezoelectric actuator is used in an image stabilizing mechanism in the camera.

Figure 1:
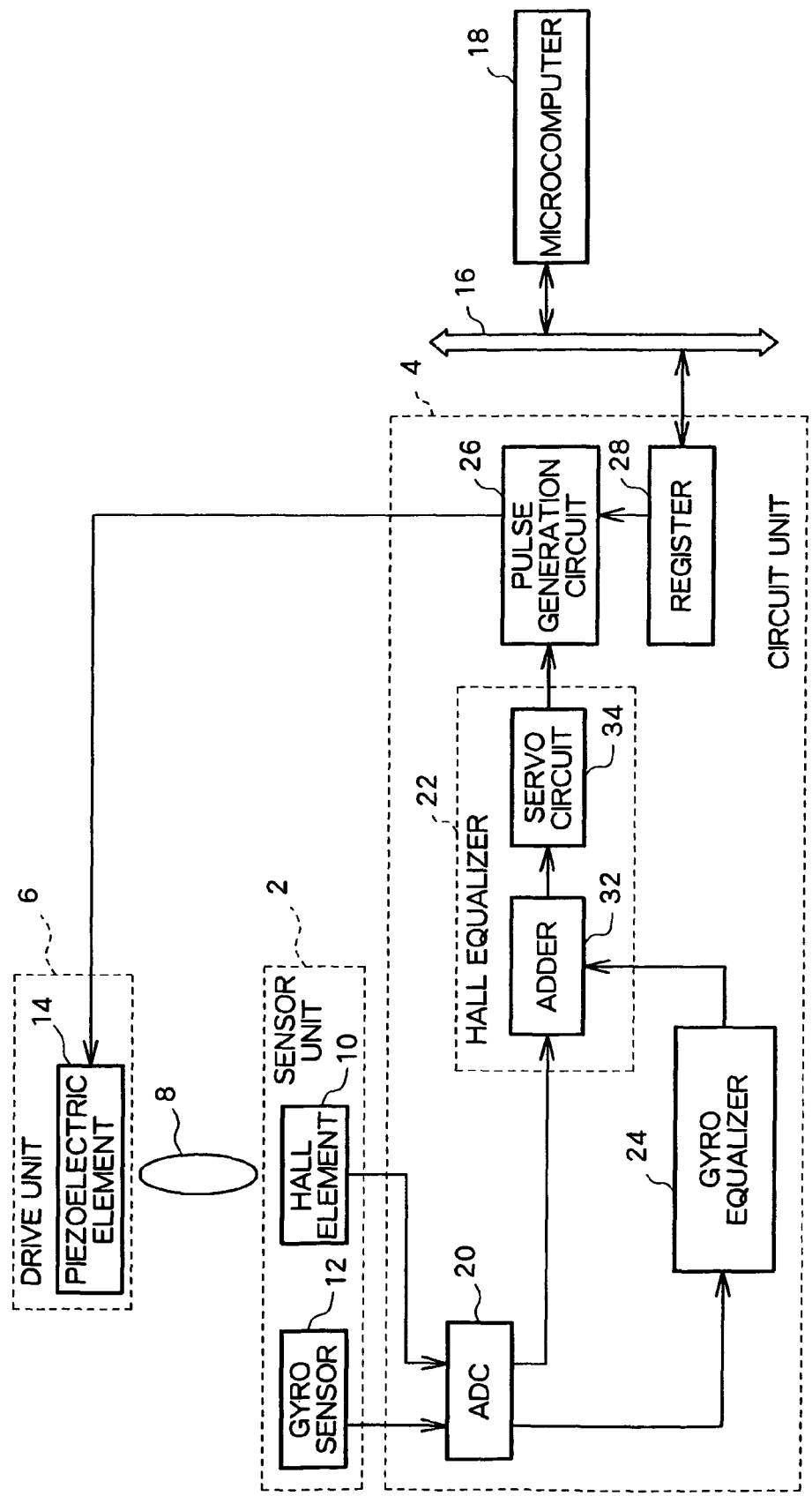
FIG. 1 is a schematic block diagram showing an image stabilizing system that uses a piezoelectric actuator according to an embodiment of the present invention.

FIG. 1 is a schematic block view showing an image stabilizing system that uses a piezoelectric actuator in the present camera. The image stabilizing system includes a sensor unit 2, a circuit unit 4, and a drive unit 6, and the circuit unit 4 is an image stabilization control circuit for controlling camera shake compensation. Several schemes are employed in image stabilizing systems, and a scheme may be adopted in the present system whereby the position of a lens 8 for forming an optical image on a light-receiving surface of an imaging element (not shown) is controlled.

The sensor unit 2 comprises a Hall element 10 and a gyro sensor 12. The Hall element 10 is a sensor provided to detect the position of the lens 8, and the Hall element 10 generates a voltage signal $V_P$ that is in accordance with the distance from the lens 8 on the basis of the magnetic field of a magnet fixed to the lens 8 and outputs the voltage signal $V_P$ to the circuit unit 4. In order to detect the two-dimensional position $(P_X, P_Y)$ of the lens 8 in the plane (x-y plane) perpendicular to the optical axis, a Hall element 10 is provided for each of the x direction and the y direction, and a signal $V_{PX}$ for the x direction and a signal $V_{PY}$ for the y direction are obtained as signals $V_P$.

The gyro sensor 12 is a sensor provided to detect vibration of the camera, and the gyro sensor 12 outputs a voltage signal $V_\omega$ that corresponds to the angular speed $\omega$ of the camera to the circuit unit 4. Two gyro sensors 12 are also provided, which detect the angular speed component $\omega_X$ about the x-axis and the angular speed component $\omega_Y$ about the y-axis, respectively, and output a signal $V_{\omega X}$ for $\omega_X$ and a signal $V_{\omega Y}$ of $\omega_Y$ as signals $V_\omega$.

The drive unit 6 is a piezoelectric actuator of the impact drive type described above, and is formed using a piezoelectric element 14. The piezoelectric element 14 to which a drive pulse signal generated by the circuit unit 4 is applied extends and retracts to cause a drive shaft to advance and retreat, and displaces the lens 8 retained on the drive shaft by friction in the direction of the drive shaft. A pair of actuators that include a piezoelectric element 14 and a drive shaft is provided in order to achieve displacement in two dimensions in the x-y plane, and displacement in the x direction and the y direction is possible.

The circuit unit 4 is connected to a microcomputer 18 via a system bus 16 or the like. The circuit unit 4 has an A/D converter (ADC: Analog-to-Digital Converter) 20, a Hall equalizer 22, a gyro equalizer 24, a pulse generation circuit 26, and a register 28. The circuit unit 4 comprises a logic circuit, and comprises an ASIC (Application-Specific Integrated Circuit), for example.

The output signals of the Hall element 10 and the gyro sensor 12 are each inputted to the ADC 20. The ADC 20 converts the voltage signals $V_{PX}$, $V_{PY}$ outputted by the two Hall elements 10, and the voltage signals $V_{\omega X}$, $V_{\omega Y}$ outputted by the two gyro sensors 12 by time division into digital data $D_{PX}$, $D_{PY}$, $D_{\omega X}$, $D_{\omega Y}$. The A/D conversion of each signal is performed periodically at each servo control cycle.

The position data $D_{PX}$, $D_{PY}$ generated based on the output of the Hall elements 10 are inputted to the Hall equalizer 22. The angular speed data $D_{\omega X}$, $D_{\omega Y}$ generated based on the output of the gyro sensor 12 are inputted to the gyro equalizer 24.

The gyro equalizer 24 performs integral processing of the angular speeds $D_{\omega X}$, $D_{\omega Y}$ inputted during a predetermined sampling period for each servo control cycle and generates data $D_{\theta X}$, $D_{\theta Y}$ that are in accordance with oscillation angles $\theta_X$, $\theta_Y$ of the camera about the x-axis and the y-axis, respectively. The gyro equalizer 24 generates and outputs, based on the data $D_{\theta X}$, $D_{\theta Y}$, vibration amount data $D_{SX}$, $D_{SY}$ that are in accordance with the amount of camera shake in the x direction and the y direction, respectively.

The Hall equalizer 22 has an adder 32 and a servo circuit 34. The adder 32 adds the position data $D_{PX}$, $D_{PY}$ inputted from the ADC 20 and the vibration amount data $D_{SX}$, $D_{SY}$ inputted from the gyro equalizer 24 separately for the x and y directions. The servo circuit 34 computes servo data $D_{SVX}$, $D_{SVY}$ that are required displacement amounts of the lens 8 from the output data $D_{AX}$, $D_{AY}$ of the adder 32.

The pulse generation circuit 26 generates a pulse for driving the piezoelectric element 14 on the basis of the servo data $D_{SVX}$, $D_{SVY}$ outputted from the Hall equalizer 22. The generated drive pulse signal is amplified to a voltage adequate for driving the piezoelectric element 14 and applied to the piezoelectric element 14. The pulse generation circuit 26 generates a pulse so that the drive unit 6 is driven in the direction in which the absolute values of $D_{SVX}$, $D_{SVY}$ decrease. A camera equipped with this system can thereby move the lens 8 in response to camera shake during the imaging period, compensate for displacement of the photographic subject image on the imaging element due to the camera shake, and obtain a high-quality image signal.

Figure 2:
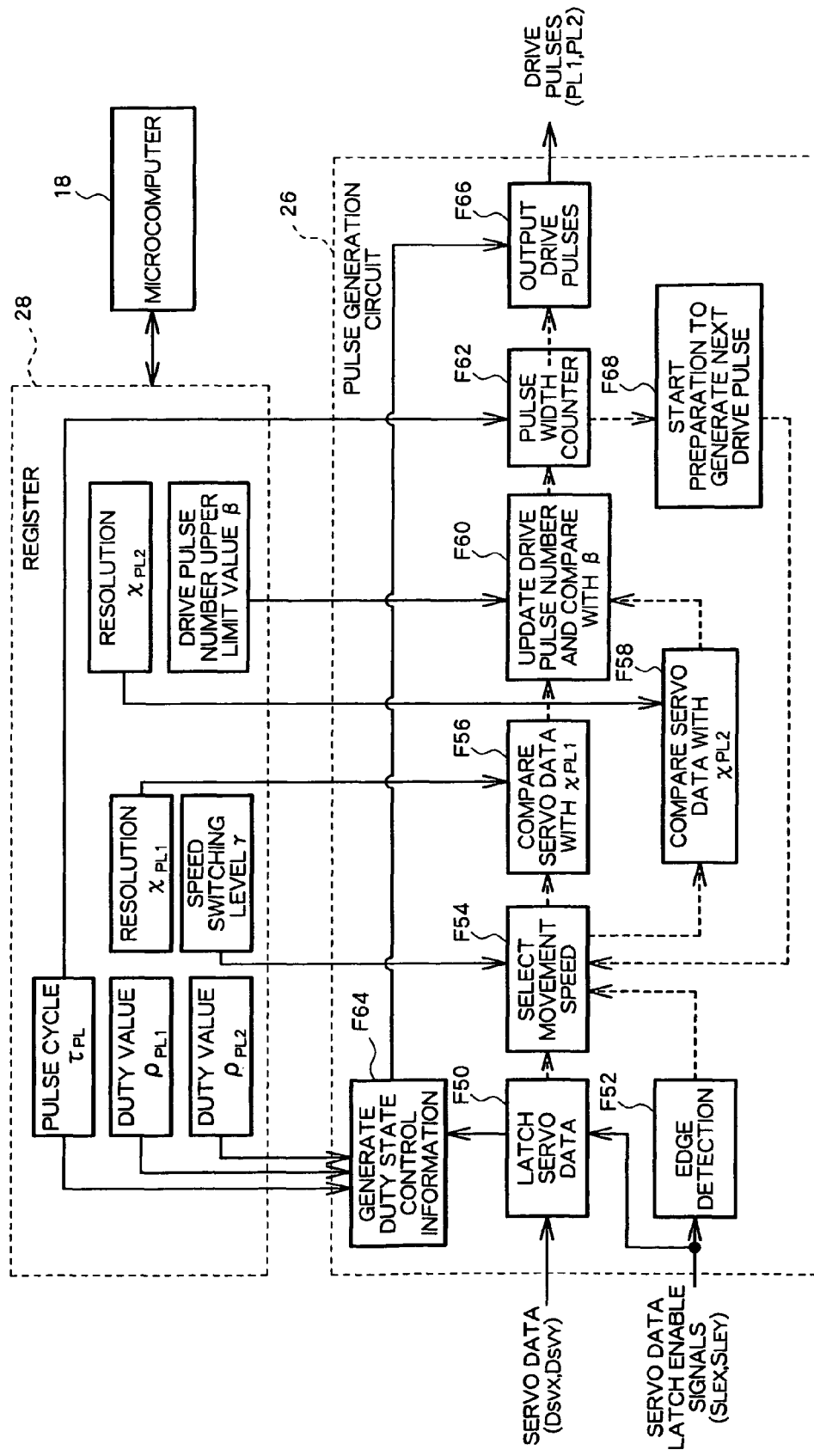
FIG. 2 is a schematic functional block diagram showing a pulse generation circuit.

FIG. 2 is a schematic functional block diagram showing the pulse generation circuit 26. The register 28 retains various types of user setting parameters used in processing by the pulse generation circuit 26. The writing and reading operations of the register 28 can be performed by the microcomputer 18 via the system bus 16. A user can perform a desired operation for the register 28 by causing the microcomputer 18 to execute a predetermined program.

The pulse generation circuit 26 in this arrangement can generate two types of drive pulses PL1, PL2 having different duty ratios. For example, in the register 28, a pulse cycle $\tau_{PL}$ of PL1, PL2, and duty values $\rho_{PL1}$, $\rho_{PL2}$ of PL1, PL2, respectively, are set as parameters for specifying the drive pulses PL1, PL2 of one cycle. The $\tau_{PL}$ can be defined by the number of cycles of a high-speed reference clock CLK that is fed to the pulse generation circuit 26, for example. The $\rho_{PL1}$, $\rho_{PL2}$ can be defined by the number of cycles of the clock CLK that are included in an H (High) level period of PL1, PL2 when the lens 8 is displaced in the positive directions of the x, y axes. Based on these settings, the pulse generation circuit 26 generates a pulse having the duty ratio ($\rho_{PL1}/\tau_{PL}$) in the case of displacement in the positive direction by PL1, and generates a pulse in which the time widths of the H level and the L (Low) level are reversed from that of displacement in the positive directions in the case of displacement in the negative directions, for example. Positive and negative duties are specified in the same manner for PL2 as well.

Generation of PL1, PL2 is switched according to the absolute value of the servo data. A speed switching level γ is stored in the register 28 in advance as a threshold value for determining the size.

The lens 8 is displaced one step for each cycle of PL1, PL2. The displacement step width is the resolution with which the position of the lens 8 is controlled. Regarding this step width, an ideal value can be calculated through prior measurement or the like, and the ideal value is stored in the register 28 in advance as the resolution $\chi_{PL1}$, $\chi_{PL2}$ of PL1, PL2. In this instance, duty values $\rho_{PL1}$, $\rho_{PL2}$ are set so that the lens 8 can be moved faster by PL1 than by PL2, and $\chi_{PL1} > \chi_{PL2}$ according to this speed difference.

An upper limit value β of the number of drive pulses generated in the servo control cycle may also be set in advance in the register 28.

Various types of parameters are thus stored in advance in the register 28. These parameters may be set separately for the x-axis and the y-axis. The pulse generation circuit 26 operates using each of these various parameters.

A servo data latch enable signal $S_{LE}$ generated in synchrony with the servo control cycle is inputted to the pulse generation circuit 26. When the signal $S_{LE}$ rises, the pulse generation circuit 26 performs an operation for latching the servo data outputted by the servo circuit 34 (F50). Since the circuit unit 4 performs x-direction servo control and y-direction servo control by time division, the signal $S_{LEX}$ for the x-direction and the signal $S_{LEY}$ for the y-direction are generated separately as signals $S_{LE}$ at mutually different timings. The circuit unit 4 acquires the output of the Hall element 10 and gyro sensor 12 in relation to the x-direction, for example, generates the servo data $D_{SVX}$, and outputs the $S_{LEX}$. The circuit unit 4 also acquires the output of the Hall element 10 and gyro sensor 12 in relation to the y-direction, generates the $D_{SVY}$, and outputs the $S_{LEY}$.

When the falling edges of the signals $S_{LEX}$, $S_{LEY}$ are detected in the pulse generation circuit 26 (F52), the pulse generation circuit 26 initiates the process from F54 to F66 for generating a drive pulse for the piezoelectric element 14.

The pulse generation circuit 26 compares the absolute values of the servo data $D_{SVX}$, $D_{SVY}$ with the predetermined speed switching level γ, determines according to the comparison results whether to generate any of PL1, PL2, and selects a movement speed (F54) The type of the selected pulse is set in a speed flag $F_{SP}$.

The pulse generation circuit 26 updates the servo data $D_{SVX}$, $D_{SVY}$ according to the displacement of the lens 8 by the drive pulse and controls generation of the drive pulse so that the servo data $D_{SVX}$, $D_{SVY}$ approach zero. Specifically, the pulse generation circuit 26 updates the servo data to values subsequent to drive pulse generation (F56, F58), using the resolution ($\chi_{PL1}$ or $\chi_{PL2}$) that corresponds to the drive pulse selected in process F54. A configuration may be adopted in which a drive pulse is not generated when the current servo data are less than the resolution (F56, F58).

The pulse generation circuit 26 counts the number of times that a drive pulse is generated in the servo control cycle, and stops outputting of the drive pulse when the generation count $n_{PL}$ exceeds an upper limit value β (F60).

A pulse width counter starts the count of the reference clock CLK in conjunction with the start of the generation of one cycle of drive pulses (F62). The timing of drive pulse generation and the like is controlled based on the count value $n_{CLK}$.

The positive/negative sign of the direction in which the lens 8 is to be moved is detected according to the sign of the latched servo data. The length of the H, L level, or the switching timing of the H, L level as control information of the duty state of one cycle of drive pulses is calculated as a number of cycles of the reference clock CLK from the sign and the pulse cycle $\tau_{PL}$ and duty value ($\rho_{PL1}$, $\rho_{PL2}$) stored in the register 28 (F64). The pulse generation circuit 26 generates and outputs a drive pulse on the basis of the reference clock CLK count value $n_{CLK}$ and the duty state control information for whichever of PL1, PL2 that is specified by the speed flag $F_{SP}$ (F66).

Preparation for generating a drive pulse is initiated slightly before $n_{CLK}$ reaches $\tau_{PL}$, so that the cycle of the next drive pulse can begin immediately following the end ($n_{CLK}=\tau_{PL}$) of the cycle of the drive pulse currently being outputted (F68).

Although the operation of the pulse generation circuit 26 that comprises an ASIC is substantially preset, the user can cause an actuator to operate according to a specific purpose by adjusting each type of parameter stored in the register 28. This configuration makes it possible to reduce the burden on the microcomputer and easily utilize a piezoelectric actuator in comparison to the conventional method in which a microcomputer controls the operation of the actuator using firmware for controlling a piezoelectric actuator.

Figure 3:
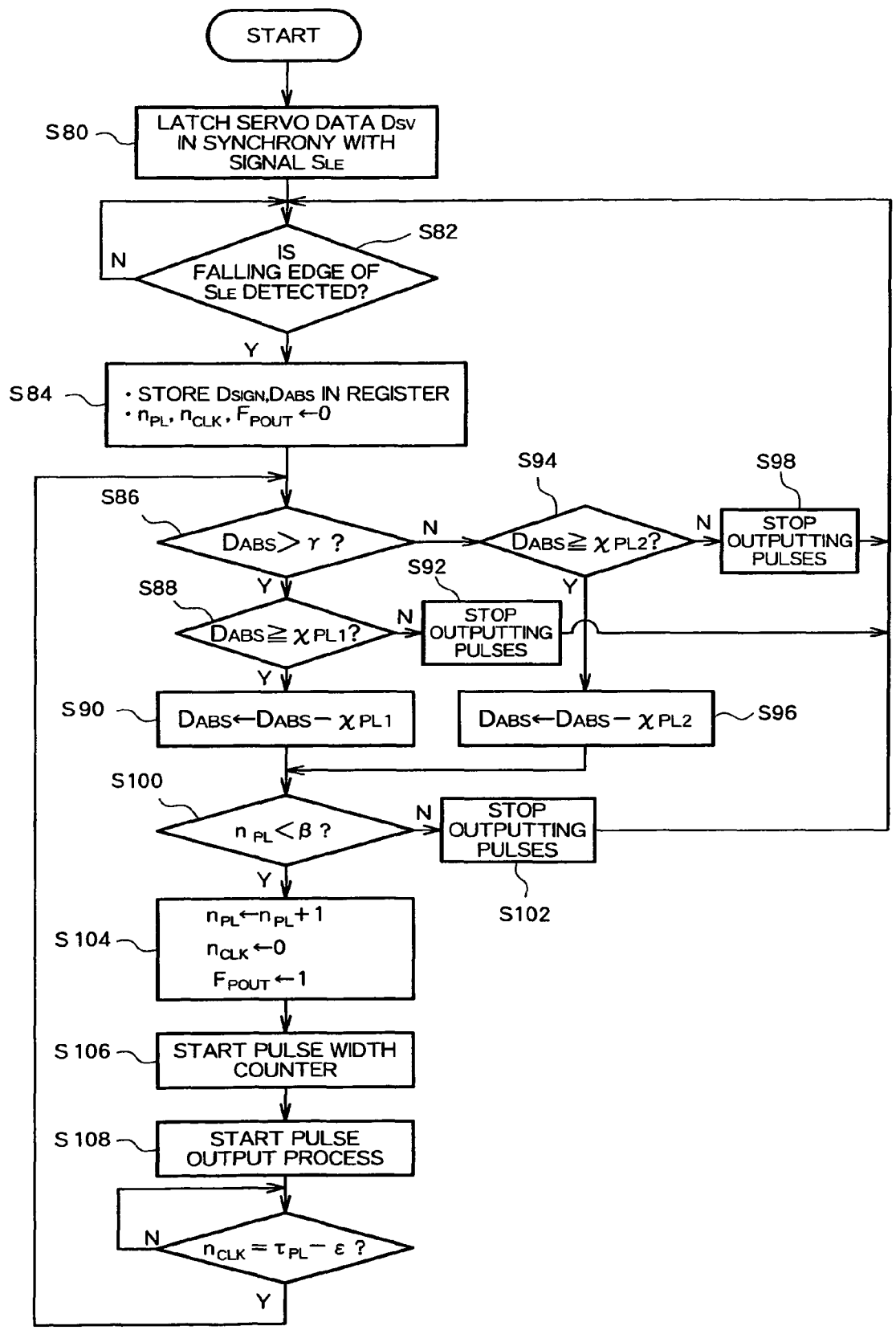
FIG. 3 is a schematic flow diagram showing the processing whereby the pulse generation circuit generates a drive pulse.

FIG. 3 is a schematic flow diagram showing the processing whereby the pulse generation circuit 26 generates a drive pulse. The servo data $D_{SV}$ ($D_{SVX}$, $D_{SVY}$) are latched in synchrony with the servo data latch enable signal $S_{LE}$ (S80; F50 of FIG. 2). When the pulse generation circuit 26 detects the falling of the $S_{LE}$ (S82; F52 of FIG. 2), the pulse generation circuit 26 stores the value $D_{SIGN}$ of the $D_{SV}$ sign bit, and the absolute value $D_{ABS}$ of the $D_{SV}$ in the register (S84). The count value $n_{PL}$ for the number of drive pulses that have been outputted, the count value $n_{CLK}$ of the pulse width counter, and the pulse output flag $F_{POUT}$ are reset to zero (S84).

The pulse generation circuit 26 compares the absolute value $D_{ABS}$ of the servo data with the speed switching level γ, and when $D_{ABS}>γ$, PL1 for producing a larger displacement (coarse movement) than PL2 is selected. When $D_{ABS}≦γ$, PL2 for producing a smaller displacement (fine movement) than PL1 is selected. Specifically, the speed flag $F_{SP}$ is set according to this selection, $F_{SP}=1$ when $D_{ABS}>γ$, and $F_{SP}=0$ when $D_{ABS}≦γ$ (S86; F54 of FIG. 2).

When $F_{SP}=1$, the $D_{ABS}$ is compared with the resolution $\chi_{PL1}$ (S88; F56 of FIG. 2). If $D_{ABS}≧\chi_{PL1}$, since the $D_{ABS}$ can be brought closer to zero by generating the PL1, i.e., there is room for the lens 8 to be brought near the target position, the $D_{ABS}$ after generation is calculated assuming generation of the PL1 by the pulse generation circuit 26. Specifically, the $D_{ABS}$ is updated using the value obtained by subtracting $\chi_{PL1}$ from the current $D_{ABS}$ (S90). When $D_{ABS}<\chi_{PL1}$, since the lens 8 is displaced past the target position by generation of the PL1, outputting of drive pulses in the current servo control period is stopped (S92). Incidentally, γ is preferably set in a range in which $γ≧\chi_{PL1}-1$ in order to prevent the output of drive pulses from being terminated in coarse movement control by PL1 before the lens 8 reaches the target position. It is thereby possible to basically transition to fine movement control by PL2 before ending with the coarse movement control, and to move the lens 8 to a position even closer to the target position.

When $F_{SP}=0$, $D_{ABS}$ is compared with the $\chi_{PL2}$ (S94; F58 of FIG. 2), whereby PL2 is generated, and a determination is made as to whether to move the lens 8. If $D_{ABS}≧\chi_{PL2}$, generation of PL2 is assumed, and the $D_{ABS}$ after generation is calculated. Specifically, the $D_{ABS}$ is updated using the value obtained by subtracting $\chi_{PL2}$ from the current $D_{ABS}$ (S96). When $D_{ABS}<\chi_{PL2}$, outputting of drive pulses in the current servo control period is terminated (S98).

When $D_{ABS}≧\chi_{PL1}$ or $D_{ABS}≧\chi_{PL2}$ (S88, S94), there is room for PL1 or PL2 to be generated in relation to the DABS as described above. In this case, a determination is furthermore made as to whether there is room to generate PL1 or PL2 in relation to the number of drive pulses in the servo control cycle (S100; F60 of FIG. 2). Specifically, if the count value $n_{PL}$ of pulses that have been outputted at the current time has reached the upper limit value β, i.e., if $n_{PL}≧β$, the operation for outputting new drive pulses in the current servo control period is terminated (S102).

When $n_{PL}<β$, the process proceeds to the outputting process of PL1 or PL2. At the start of the pulse outputting process, the count value $n_{PL}$ of pulses that have been outputted is increased by one and updated, and the count value $n_{CLK}$ of the pulse width counter is reset to zero (S104). The pulse output flag $F_{POUT}$ is also set to one (S104). The pulse width counter is then started (S106). The pulse outputting process is started following the setting of the pulse output flag $F_{POUT}$ to one (S108). It is possible for the pulse width counter operation and the pulse outputting process to each be executed in the pulse generation circuit 26 concurrently with the preparation processes S86 through S102 prior to the drive pulse generation described above, and when the value $n_{CLK}$ of the pulse width counter reaches the value ($\tau_{PL}-\epsilon$) immediately prior to the end of counting, the preparation processes S86 through S102 for the subsequent drive pulse are initiated while generation of the current drive pulse is continued (S110; F68 of FIG. 2). The value of $\epsilon$ is set according to the time required for the preparation processes S86 through S102, and is set to about 2, for example. The pulse width counter counts the reference clock CLK, as described above.

In the pulse outputting process, drive pulse duty state control information is generated from the sign bit value $D_{SIGN}$, the speed flag $F_{SP}$, the duty values $\rho_{PL1}$, $\rho_{PL2}$, and the pulse cycle $\tau_{PL}$ (F64 of FIG. 2). The pulse generation circuit 26 switches between the H level and the L level of the output voltage on the basis of the $n_{CLK}$ and the control information for determining the duty, and generates and outputs a drive pulse.

Figure 4:
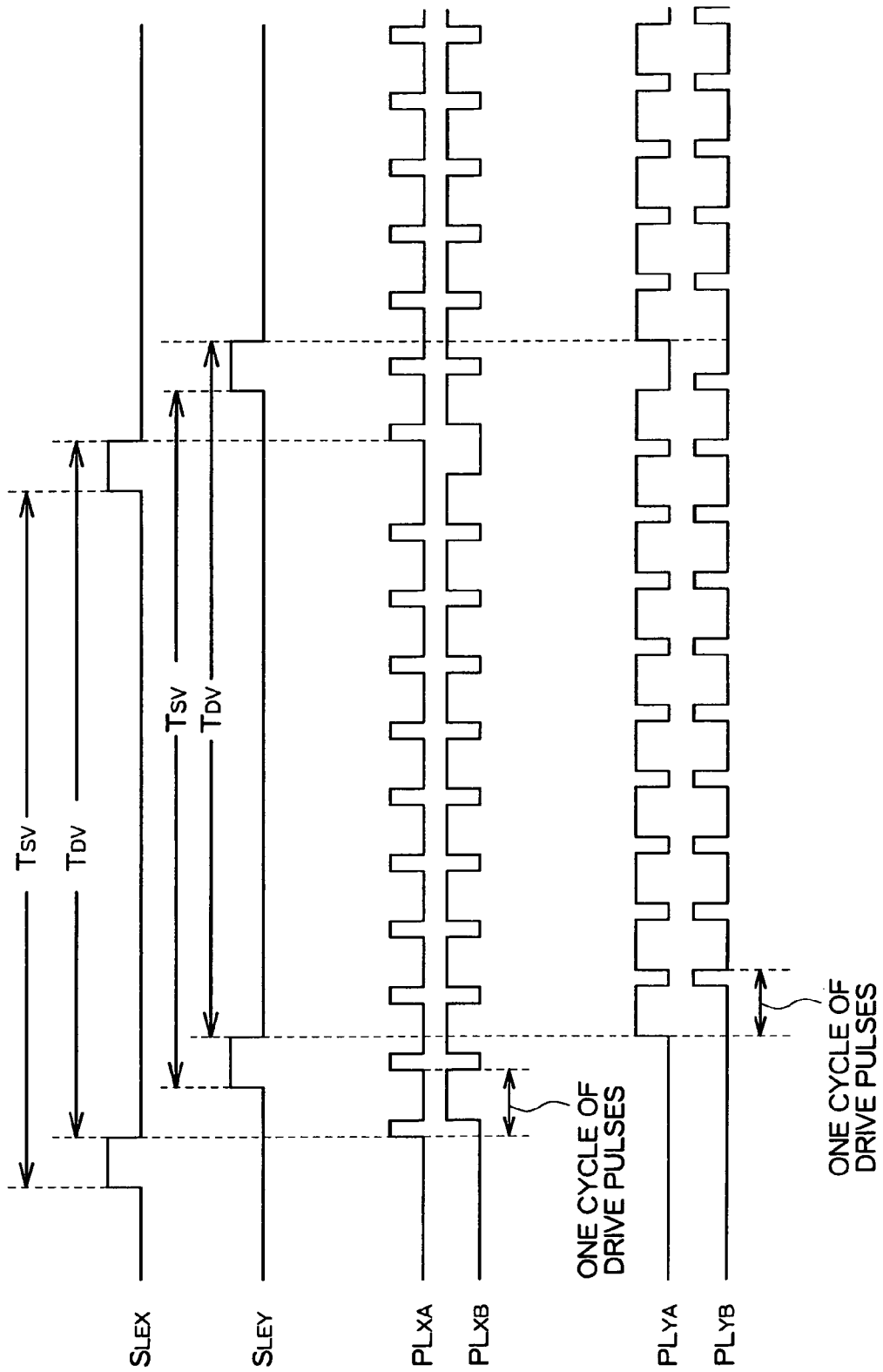
FIG. 4 is a schematic timing diagram showing the signal waveform of the drive pulses.

FIG. 4 is a schematic timing chart showing the signal waveform of the drive pulses. In FIG. 4, the time axis is in the horizontal direction, and the servo data latch enable signals $S_{LEX}$, $S_{LEY}$, the drive pulses $PL_{XA}$, $PL_{XB}$ for the x-direction piezoelectric actuator, and the drive pulses $PL_{YA}$, $PL_{YB}$ for the y-direction piezoelectric actuator are arranged and indicated in the vertical direction. The pulses $PL_{XA}$ and $PL_{XB}$ are applied to both poles, respectively, of the piezoelectric element 14 of the x-direction actuator, and are generated in complementary waveforms. In the same manner, $PL_{YA}$ and $PL_{YB}$ are pulses that are applied to both poles, respectively, of the piezoelectric element 14 of the y-direction actuator. For the x direction, for example, the servo control cycle $T_{SV}$ is the interval of the rising timing of $S_{LEX}$, and the drive pulses $PL_{XA}$, $PL_{XB}$ can be generated in the interval $T_{DV}$ of the falling timing of $S_{LEX}$. The upper limit value of the number of drive pulses generated in $T_{DV}$ is specified by $\beta$. The value of $\beta$ is set so as to satisfy $\beta \leq T_{DV}/(T_{CLK} \cdot T_{PL})$, wherein $T_{CLK}$ is the length of one cycle of the reference clock CLK. FIG. 4 shows an example in which $\beta=10$.

Figure 5:
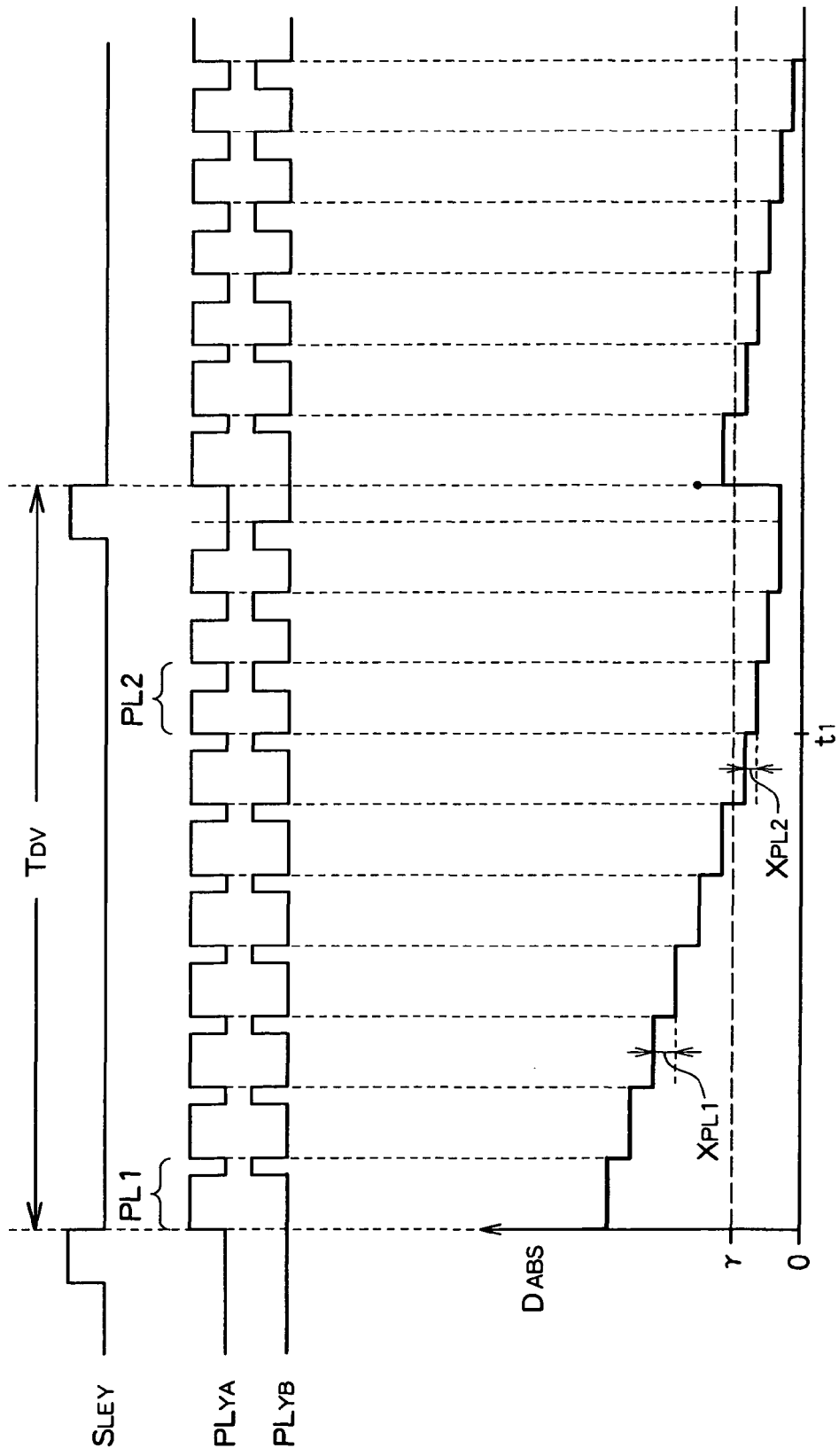
FIG. 5 is a schematic timing diagram showing an example of servo control using a piezoelectric actuator.

FIG. 5 is a schematic timing diagram showing an example of servo control using a piezoelectric actuator. In FIG. 5, the time axis is in the horizontal direction, and the servo data latch enable signal $S_{LEY}$, the drive pulses $PL_{YA}$, $PL_{YB}$, and the absolute value $D_{ABS}$ of the servo data $D_{SVY}$ are arranged and indicated in the vertical direction. This example is of a case in which the absolute value of $D_{SVY}$ latched in the falling of $S_{LEY}$ is a value that exceeds the speed switching level $\gamma$. The value of $D_{ABS}$ is reduced a predetermined step width each time a drive pulse occurs, and gradually approaches zero, which corresponds to the target position of the lens 8. At the start of driving, $D_{ABS}$ is larger than $\gamma$, and generation of the drive pulse PL1 is selected in process S86. The lens 8 is thereby displaced by a relatively large step width. This step width basically corresponds to the ideal value set in the register 28 as the resolution $\chi_{PL1}$, and $D_{ABS}$ is updated to a value that is less by an amount commensurate with $\chi_{PL1}$. Generation of the drive pulse PL1 is repeated while $D_{ABS}$ is larger than $\gamma$.

When $D_{ABS}$ is equal to or less than $\gamma$, generation of the drive pulse PL2 is selected in process S86, and the lens 8 is displaced by a step width smaller than that of PL1 (time t1). The step width of PL2 basically corresponds to the ideal value set in the register 28 as the resolution $\chi_{PL2}$, and $D_{ABS}$ is updated to an amount that is less by an amount commensurate with $\chi_{PL2}$.

The pulse generation circuit 26 can thus switch between a coarse movement operation for displacing the lens 8 by a large step width by PL1, and a fine movement operation for displacing the lens 8 by a small step width by PL2. The lens 8 can thereby be made to rapidly approach the target position by a number of drive pulses that is limited within a period $T_{DV}$ that is in accordance with the servo control cycle by the coarse movement operation even when $D_{ABS}$ is large. Although the speed at which the target position is approached is reduced by the fine movement operation, suitable positional accuracy can be obtained.

In particular, the time taken to reach the target position can be shortened, and the accuracy of the position reached can be maintained at the same time by switching as $D_{ABS}$ gradually approaches zero so that coarse movement is performed while $D_{ABS}$ is in a large range, and fine movement is performed while $D_{ABS}$ is in a small range, as described above.

Figure 6:
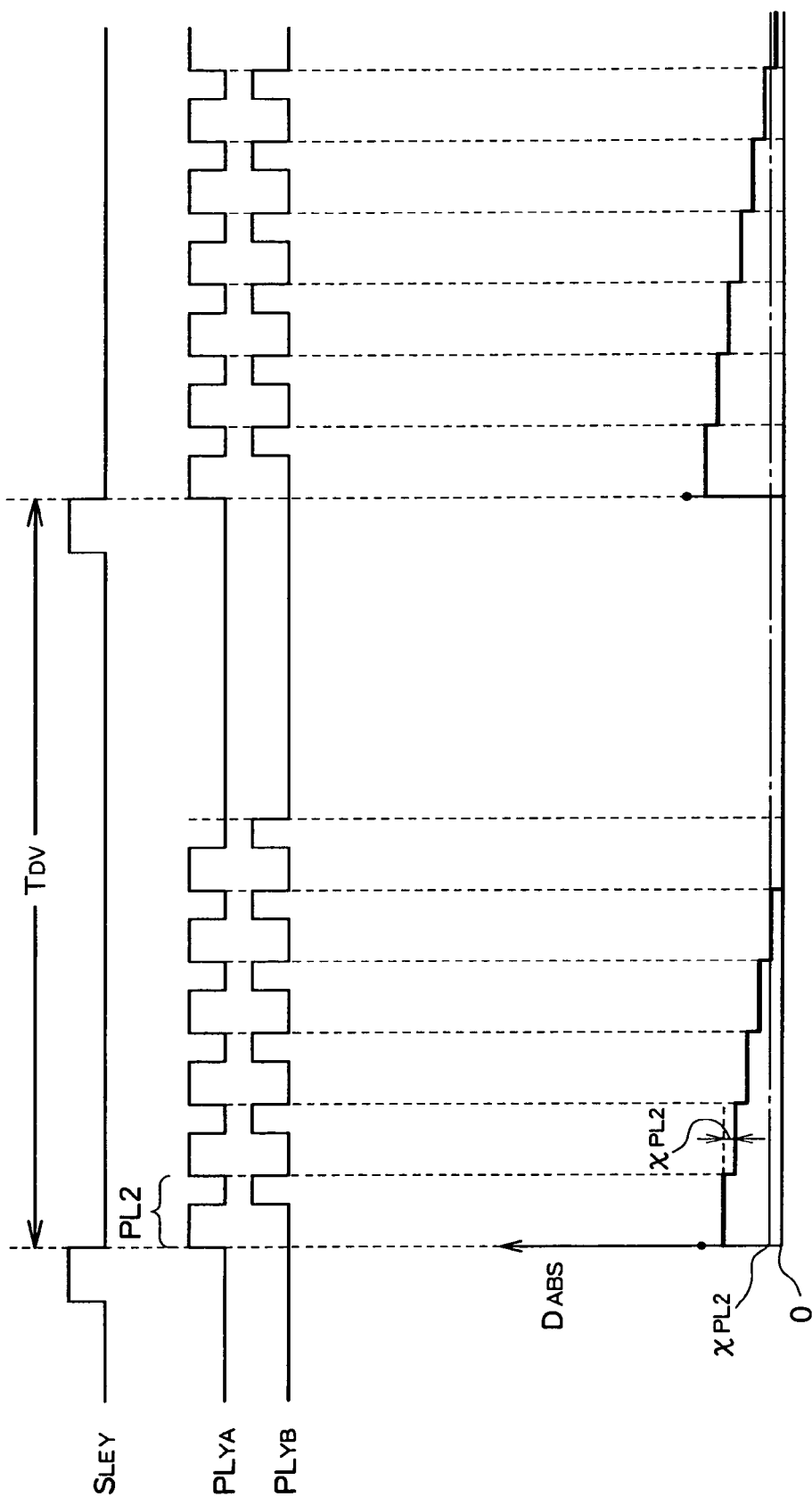
FIG. 6 is a schematic timing diagram showing another example of servo control using a piezoelectric actuator.

FIG. 6 is a schematic timing diagram showing another example of servo control using a piezoelectric actuator. In FIG. 6, the time axis is in the horizontal direction, and the servo data latch enable signal $S_{LEY}$, the drive pulses $PL_{YA}$, $PL_{YB}$, and the absolute value $D_{ABS}$ of the servo data $D_{SVY}$ are arranged and indicated in the vertical direction, the same as in FIG. 5. In this example, since the absolute value of $D_{SVY}$ latched in the falling of $S_{LEY}$ is relatively small, pulse output is stopped before the number of drive pulses reaches the upper limit value $\beta$. For example, since the $D_{ABS}$ is initially equal to or less than $\gamma$, the pulse generation circuit 26 initiates generation of drive pulses PL2 for fine movement. The $D_{ABS}$ is reduced by an amount commensurate with the resolution $\chi_{PL2}$ each time PL2 occurs. When the pulse generation circuit 26 detects that $D_{ABS}$ is less than $\chi_{PL2}$ (process S94 of FIG. 3), since the lens 8 would move past the target position if more drive pulses were to occur, drive pulse output is stopped (S98), and the current position that is estimated to be suitably close to the target position is maintained until the beginning of the next servo control cycle.

The present invention can also be used in an image stabilizing system for displacing an imaging element instead of a lens 8 through the use of a piezoelectric actuator. The embodiment described above relates to an image stabilizing system, but the present invention can be applied in general to a circuit for driving a piezoelectric actuator used in an autofocus or other servo control system.

A configuration was described in which it is possible to switch between two speed levels for coarse movement and fine movement using two types of drive pulses PL1, PL2 having different duty ratios, but a configuration may also be adopted in which information for defining even more duty states is stored in the register 28, and it is possible to switch between a larger number of speed levels.

The present invention makes it possible to perform rapid movement by setting a duty state for coarse movement, and to displace a movement object with good precision by setting a duty state for fine movement.

What is claimed is:

1. An image stabilization control circuit comprising:
   a vibration compensation signal generation unit for generating, based on an output signal of a sensor for detecting a vibration of an imaging device, a vibration compensation signal that is in accordance with an amount of displacement of the imaging device caused by the vibration;
   a lens control unit for generating a signal for controlling driving of a drivable lens on the basis of the vibration compensation signal and an output signal of a sensor for detecting a drive position of the lens of the imaging device; and
   a piezoelectric actuator drive circuit for generating, based on the output signal of the lens control unit, a square-waveform drive signal for driving a piezoelectric actuator for displacing the lens one step at a time;
   wherein the piezoelectric actuator drive circuit has:
   a duty storage unit for storing information for defining first and second duty states for producing displacements having mutually different step widths for a duty of the drive signal;
   a drive signal generation unit for generating the drive signal of the first or second duty state on the basis of information stored in the duty storage unit; and
   a control unit capable of controlling whether the generated drive signal is set to any of the first and second duty states and switching between displacing the lens through fine movement having a small step width, and displacing the lens through coarse movement having a large step width.

2. The image stabilization control circuit according to claim 1, wherein the piezoelectric actuator drive circuit has a switching level storage unit for storing a switching level that can be arbitrarily set; wherein the control unit controls the drive signal generation unit in accordance with a result of comparing the switching level and displacement amount of the lens, designates a state of the coarse movement when the displacement amount is larger than the switching level, and designates a state of the fine movement when the displacement amount is equal to or less than the switching level.

3. The image stabilization control circuit according to claim 1, wherein the duty storage unit, the drive signal generation unit, and the control unit comprise an ASIC; and the duty storage unit is housed within the ASIC and comprises a register in which stored content can be rewritten.

4. The image stabilization control circuit according to claim 2, wherein the duty storage unit, the switching level storage unit, the drive signal generation unit, and the control unit comprise an ASIC; and the duty storage unit and the switching level storage unit are housed within the ASIC and comprise registers in which stored content can be rewritten.

5. An imaging device comprising the image stabilization control circuit according to claim 1.

* * * * *